Patented Apr. 16, 1935

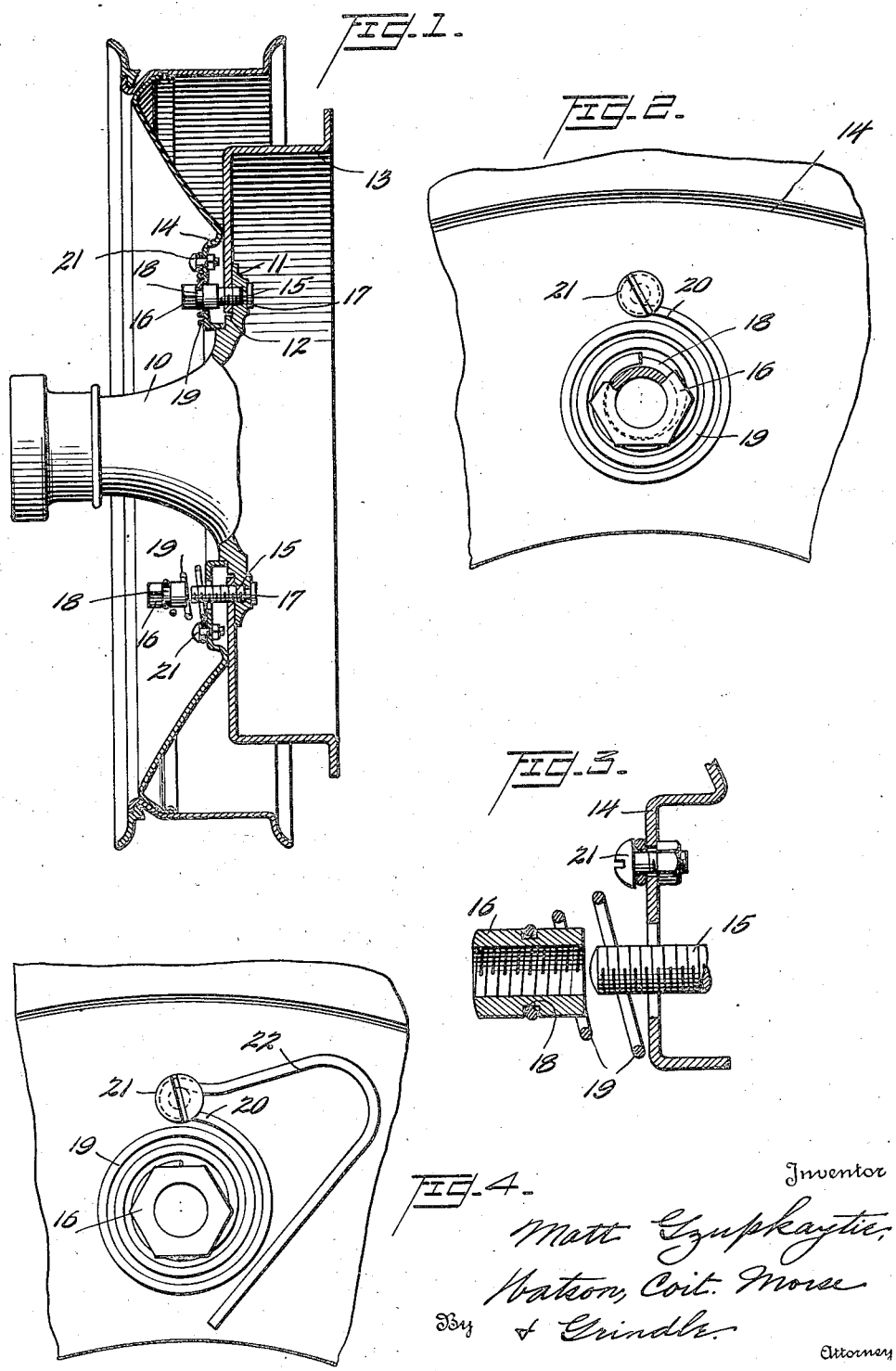

1,997,821

UNITED STATES PATENT OFFICE 1,997,821

DEMOUNTABLE WHEEL

Matt Gzupkaytie, Baltimore, Md.

Application May 19, 1934, Serial No. 726,601

4 Claims. (Cl. 301—9)

The present invention relates to demountable wheels for automotive equipment and more particularly to means to retain the nuts on the demountable part of a wheel.

The principal object of the invention is to provide means for supporting the nuts adapted to clamp the demountable member of the wheel against the hub in such manner that they will be retained, when the wheel is demounted, in such position that they will register with the supporting studs and can be screwed on the same in remounting the wheel.

Other objects and features of novelty will be apparent from the description taken in connection with the drawing, in which:

Fig. 1 is an elevational view, mostly in section, showing the present invention associated with part of a demountable wheel;

Fig. 2 is a front view of one of the nuts and its supporting spring together with a fragment of a wheel;

Fig. 3 is a sectional elevation of a nut and associated parts, drawn to a larger scale, and Fig. 4 is a front elevation similar to Fig. 2 illustrating a modification.

Referring to the drawing, the reference character 10 indicates the hub of a vehicle wheel having a radially extending flange 11 provided with the rabbeted seat 12 for the brake drum 13. The demountable portion of the wheel is provided with a member 14 adapted to be clamped against the brake drum and flange 11 by means of a circular series of studs 15 and nuts 16. The studs are threaded into the flange 11 of the hub and may have their ends riveted over as shown at 17.

Means are provided on the member 14 for supporting the nuts 16 for both rotation and axial movement. In the form shown, for this purpose, the nuts are each provided with an annular groove 18 intermediate their ends in which is seated the apex turn of a conical, helical spring 19. The base turn of this spring, at its free end portion 20 is formed with a loop through which extends a bolt 21 clamping the spring against the member 14. When the nuts are unscrewed from the studs 15 the springs 19 hold them in the position shown in Fig. 3, that is to say, with the nuts in alignment with their respective studs 15 and slightly spaced from the ends of the studs. It will be seen when the wheel is demounted, the springs will retain the nuts so that in remounting the wheel the nuts will be in position to be screwed onto the studs 15. The springs 19 permit the nuts to be pushed toward the studs 15 and start threading of the nuts thereon. Thereafter by means of a wrench, the nuts are screwed home as indicated in the upper part of Fig. 1.

When the nuts have been tightened against the member 14, it may happen that the base turns of the conical springs will not bear throughout their length against the member 14, in which case there is a tendency to cant the springs and increase the friction between the nuts and studs 15. Usually the bolts 21 clamp the free ends of the springs sufficiently so that the springs will not tend to cant. However, in order to further guard against canting of the spring, the free end of the loop of the base turn may be extended as shown at 22 and rest against the member 14.

In operation the wheel is demounted by unscrewing the nuts 16, then the wheel is taken off the studs 15 and, of course, the nuts will be held in alignment with the holes for the studs in the member 14. To remount the wheel, the member 14 is placed on the studs 15 and then the nuts 16 threaded on to the studs.

Having thus described the invention what is claimed as new and desired to be secured by Letters Patent is:

1. In a demountable wheel construction having a hub, a circular series of attaching studs carried by the hub, a part of the wheel having a member with apertures receiving said studs, nuts for said studs, and means for supporting said nuts in alignment with the studs respectively and for rotatable and axial movement comprising conical, helical springs, the end of the base turn of each being formed as a loop, bolts extending through said loops clamping the same to said member, the apex turn being rotatably secured to a nut, and the free end of the loop being extended and resting against said member.

2. In a demountable wheel construction having a hub, a circular series of attaching studs fixed to the hub, a part of the wheel having a member with apertures receiving said studs, nuts for said studs, and means on said member supporting said nuts in alignment with the studs respectively and for rotatable and axial movement, said nut supporting means comprising conical, helical springs, the base turn of each being rigidly secured to said member, and the apex turn rotatably secured to a nut.

3. In a demountable wheel construction having a hub, a circular series of attaching studs fixed to the hub, a part of the wheel having a member with apertures receiving said studs, nuts for said studs, each nut being formed with an annular groove, and means on said member supporting said nuts in alignment with the studs respectively and for rotatable and axial movement, said nut supporting means comprising conical, helical springs, the base turn of each of which is rigidly secured to said member, and the apex turn rotatably disposed in said groove.

4. In a demountable wheel construction having a circular series of attaching studs fixed to the hub, a part of the wheel having a member with apertures receiving said studs, nuts for said studs, and means on said member suporting said nuts in alignment with the studs respectively and for rotatable and axial movement, said means comprising conical, helical springs, the end of the base turn of each being formed as a loop, bolts extending through said loops clamping the same to said member, and the apex turn of each spring being rotatably secured to a nut.

MATT GZUPKAYTIE.